UNITED STATES PATENT OFFICE.

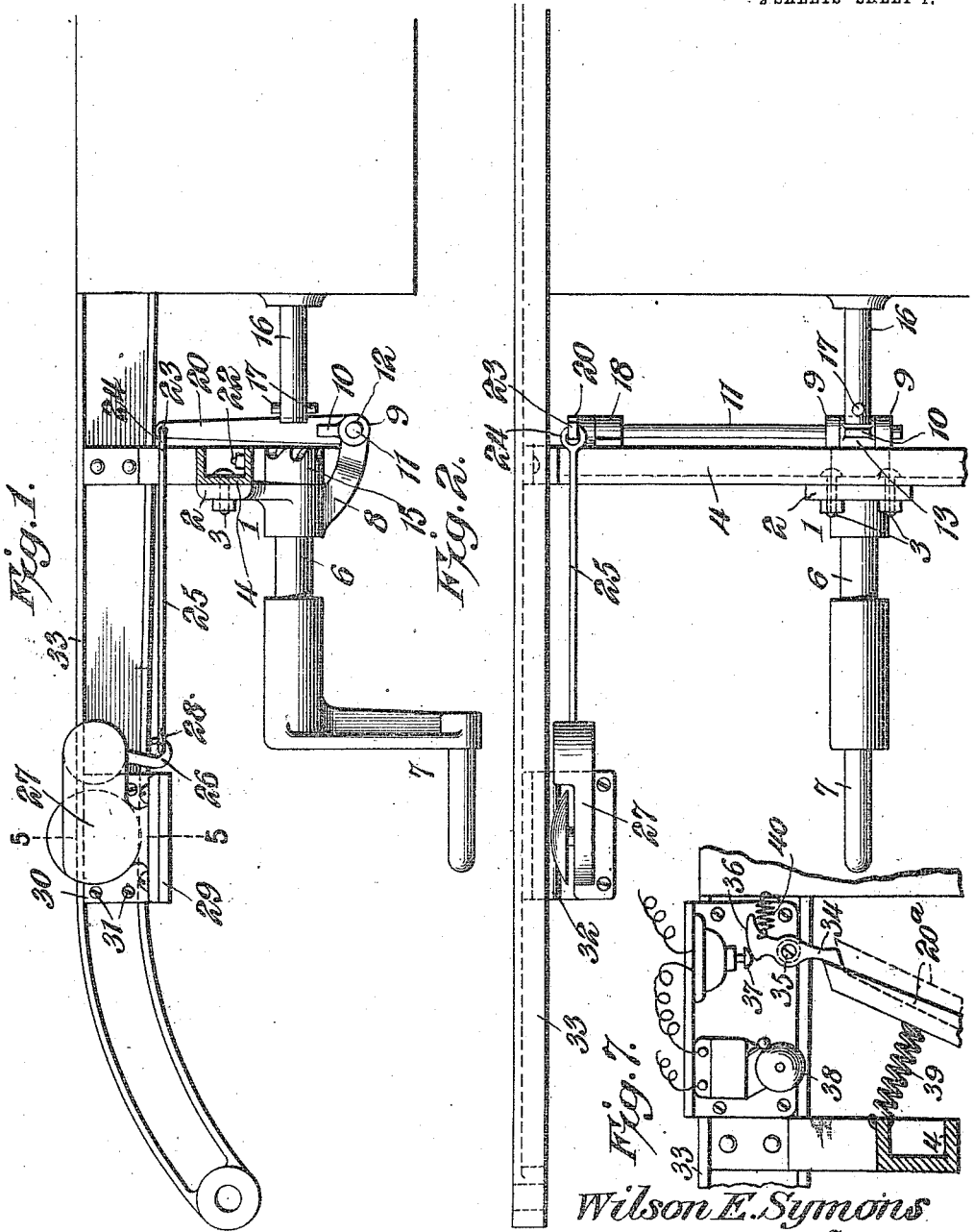

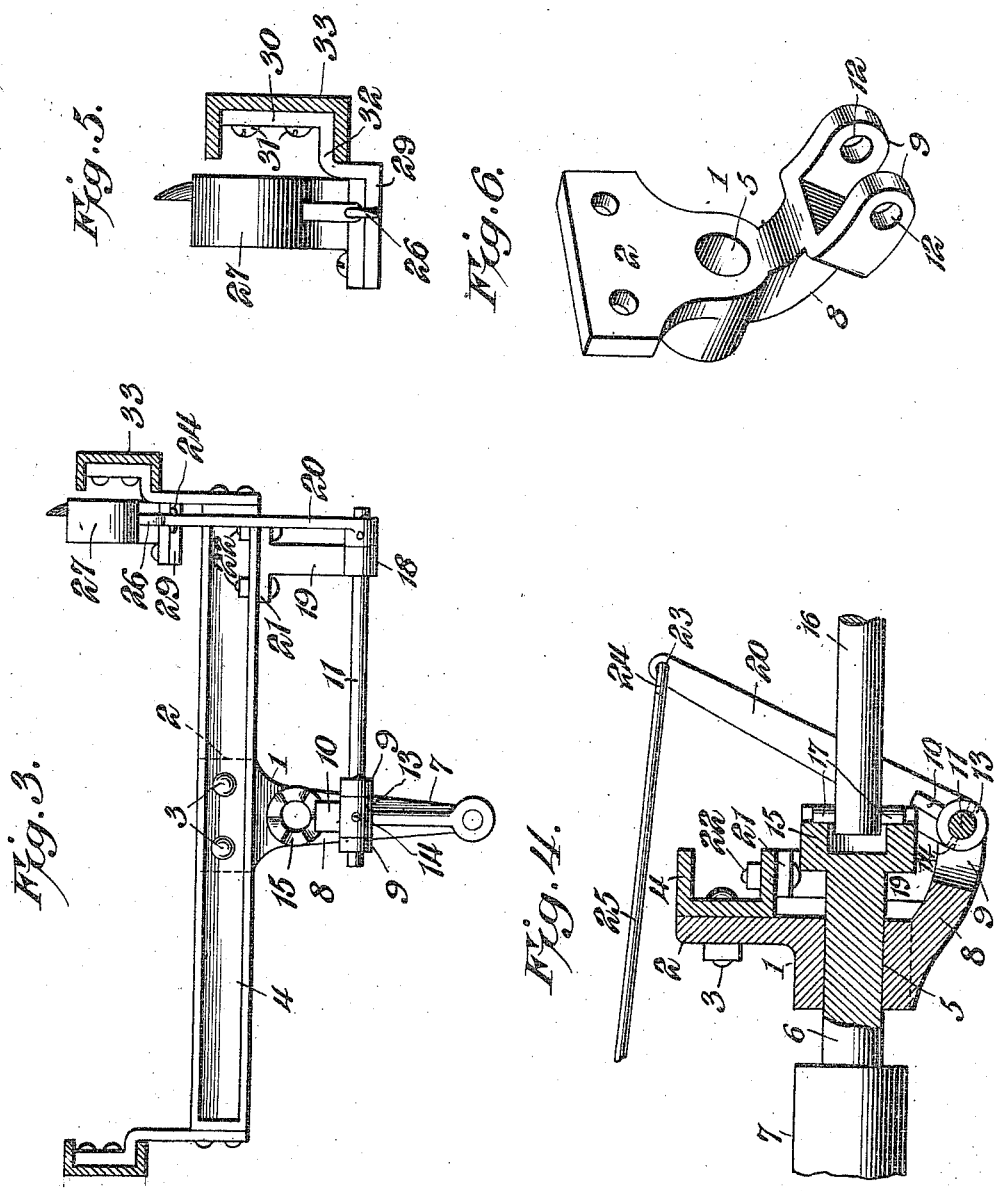

WILSON E. SYMONS, OF CHICAGO, ILLINOIS.

ALARM FOR AUTOMOBILES.

1,019,552.   Specification of Letters Patent.   Patented Mar. 5, 1912.

Application filed May 15, 1911. Serial No. 627,259.

*To all whom it may concern:*

Be it known that I, WILSON E. SYMONS, a citizen of the United States, residing at Chicago, in the county of Cook and State of Illinois, have invented a new and useful Alarm for Automobiles, of which the following is a specification.

The invention relates to an alarm for automobiles.

The object of the present invention is to provide for automobiles a simple, efficient and comparatively inexpensive device, adapted, should any unauthorized person attempt to crank an automobile, to sound an alarm, which will either frighten away the thief, or through its continuous ringing attract attention and give notice that the automobile has been stolen or an attempt made to steal it.

A further object of the invention is to provide an alarm of this character, adapted to be mounted on an automobile and provided with means for enabling the alarm to be readily connected with and disconnected from the operating mechanism, so that the machine may be cranked by the owner or other proper person without sounding the alarm.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation, partly in section, of an alarm, constructed in accordance with this invention and shown applied to a portion of an automobile. Fig. 2 is a plan view of the same. Fig. 3 is a front elevation, the side beams or members of the frame of the automobile being in section. Fig. 4 is a detail sectional view, illustrating the manner of mounting the starting crank and the alarm operating shaft. Fig. 5 is a detail sectional view on the line 5—5 of the Fig. 1. Fig. 6 is a detail perspective view of the bearing bracket. Fig. 7 is a detail view partly in section, showing an electrical alarm.

Like numerals of reference designate corresponding parts in all the figures of the drawings.

In the accompanying drawings in which is illustrated the preferred embodiment of the invention, 1 designates a bearing bracket, provided with an upper attaching portion 2, secured by bolts 3, or other suitable fastening devices to the front transverse bar or beam 4 of an automobile frame at the center of the said bar or beam, as clearly illustrated in Fig. 3 of the drawings. The bracket is provided at an intermediate point with a horizontal bearing opening 5 for the reception of the shaft or spindle portion 6 of the starting crank 7. The bearing bracket is also provided with a lower rearwardly extending portion 8, which is forked or bifurcated to provide spaced sides 9, between which is arranged a short inner arm 10 of a transverse operating shaft 11. The operating shaft 11 is journaled at its inner end in opposite bearing openings 12 of the spaced sides 9, and the short inner arm 10 is provided with a hub or sleeve 13, which is secured by a pin 14, or other suitable fastening device to the shaft 11. The short arm 10 extends upward into the path of the inner toothed end or head 15 of the shaft portion 6 of the starting crank, and is adapted to be engaged and oscillated by the same when the starting crank is moved inwardly to engage it with the outer end of the engine shaft 16. The outer end of the engine shaft 16 is provided with opposite projections 17, arranged to be engaged by the toothed head 15 of the starting crank, but any other suitable construction may, of course, be employed for connecting the starting crank with the engine shaft. The outer portion of the transversely disposed shaft 11 is journaled in a suitable bearing 18 of a hanger 19, and the outer end of the said shaft 11 carries an upwardly extending arm 20. The hanger, which is provided at the top with laterally extending attaching portions or flanges 21, is secured by bolts 22, or other suitable fastening devices.

The outer arm 20 is provided at its upper end with an opening 23 into which is linked an eye 24 of a longitudinal connecting rod 25, which extends forwardly to a trigger 26 of an alarm 27. The trigger 26, which is hook-shaped, detachably receives the front or outer end of the connecting rod, which is provided with an eye 28 to engage the hook of the trigger. The alarm 27, which may be of any preferred construction, is preferably a burglar alarm, equipped with means for continuously ringing a bell when tripped or set in operation by pulling upon the trigger 26. As any form of alarm may be employed and as the particular construction of alarm does not constitute a portion of the present invention, a detail description and illustration of the construction of the same are deemed unnecessary. The alarm is mounted upon a bracket 29, having a horizontal supporting portion to receive the alarm and provided with a vertical attaching portion 30, which is secured by screws 31, or other suitable fastening devices to one of the side beams or members of the frame of the automobile. The vertical and horizontal portions of the bracket are connected by an L-shaped or angular portion 32, which permits the vertical attaching portion to fit between the flanges of the side bar or member 33, which is constructed of channel metal. The alarm may be mounted on an automobile at any other desired point, and will be preferably concealed from view so that its presence may not be detected by a thief or other unauthorized person. When the rod 25 is connected to the trigger of the alarm and an attempt is made to crank the engine, the inward movement of the starting crank will engage the inner arm or projection 10 of the shaft 11 and will oscilliate the latter, and swing the outer arm 20 rearwardly, thereby pulling upon the trigger and operating the alarm. When the rod 25 is disconnected from the alarm, the engine may be cranked without operating the same. The continuous ringing of the alarm will either frighten away the thief, or give notice that the machine is either stolen or operated by an unauthorized person.

In Fig. 7 of the drawings is illustrated one form of electrical alarm comprising a cam lever 34, pivoted at an intermediate point by a pin 35, or other suitable fastening device and consisting of upper and lower arms, the lower arm being arranged in the path of the arm 20ª. The arm 20ª, which corresponds with the arm 20 heretofore described, is designed to be mounted similar to the said arm 20. The upper end of the arm 20ª is normally located in advance of the lower arm of the cam lever, which is provided at its upper end with a cam edge 36, arranged to depress or actuate a button 37 for closing the circuit of an electric bell 38. When the arm 20ª is moved inwardly or rearwardly, it oscillates the cam lever and rings the electric bell. The arm 20ª is returned to its normal position by a coiled spring 39, and when free to move, the cam lever 34 is returned to its initial position by a coiled spring 40. The electric bell may be located at any convenient point and instead of the push button and cam lever, any other form of switch or contact element may be employed.

Having thus fully described my invention, what I claim as new and desire to secure by Letters Patent, is:

1. In a device of the class described, the combination with the starting crank mechanism of an automobile, an alarm, and operating mechanism for the alarm arranged in the path of and adapted to be engaged by the said crank mechanism, said operating mechanism being connected with the said alarm.

2. In a device of the class described, the combination with the starting crank mechanism of an automobile, an alarm, and operating mechanism for the alarm arranged in the path of and adapted to be engaged by said crank mechanism, and means for connecting the operating mechanism with and disconnecting it from the said alarm.

3. In a device of the class described, the combination with the strating crank mechanism of an automobile, an alarm, an operating shaft having an arm or projection arranged in the path of said crank mechanism and adapted to be engaged and actuated by the same, and means for connecting the shaft with and disconnecting it from the alarm.

4. In a device of the class described, the combination with the starting crank mechanism of an automobile, an alarm, a transverse shaft having inner and outer arms, the inner arm being arranged in the path of and adapted to be engaged and actuated by said crank mechanism, and means for connecting the outer arm of the shaft with and disconnecting it from the alarm.

5. In a device of the class described, the combination with the starting crank mechanism of an automobile, an alarm having a trigger, a transverse shaft provided with inner and outer arms, the inner arm being arranged in the path of and adapted to be engaged and actuated by the said crank mechanism, and connecting means extending from the outer end of the shaft to the trigger and detachably connected with the latter.

6. In a device of the class described, the combination with the starting crank mechanism of an automobile including a crank and a shaft, of a bracket having a bearing receiving and supporting the crank shaft, a shaft also mounted on the bracket and provided with an arm or projection arranged in the path of and adapted to be engaged by the crank shaft, an alarm, and means for connecting the alarm with the shaft having the arm or projection.

7. In a device of the class described, the combination with the starting crank mechanism of an automobile including a crank and a shaft, of a bracket having an upper attaching portion and provided at an intermediate point with a bearing opening to receive the crank shaft and having a lower rearwardly extending forked portion, a shaft mounted on the forked portion and having an arm or projection operating between the sides thereof and arranged to be engaged and actuated by the crank shaft, an alarm, and means for connecting the alarm with the shaft having the arm or projection.

8. In a device of the class described, the combination with the starting crank mechanism of an automobile including a crank and a shaft, of a bracket having a bearing receiving the crank shaft, a transverse shaft supported at its inner portion by the bracket and provided with an arm or projection arranged to be engaged and actuated by the crank shaft, said transverse shaft being also provided at its outer portion with an arm, a hanger having a bearing receiving the outer portion of the said transverse shaft, an alarm, and means for detachably connecting the outer arm of the transverse shaft with the alarm.

In testimony that I claim the foregoing as my own, I have hereto affixed my signature in the presence of two witnesses.

WILSON E. SYMONS.

Witnesses:
 ALFRED COWLES,
 G. E. TENTON.

---

Copies of this patent may be obtained for five cents each, by addressing the "Commissioner of Patents, Washington, D. C."